United States Patent [19]

Mayhew et al.

[11] Patent Number: 4,781,662

[45] Date of Patent: Nov. 1, 1988

[54] UNIVERSAL JOINT WITH IMPROVED LUBRICATION

[75] Inventors: Roger D. Mayhew, Fredonia; Irwin F. Whitty, Campbellsport, both of Wis.

[73] Assignee: Weasler Engineering, Inc., West Bend, Wis.

[21] Appl. No.: 887,484

[22] Filed: Jul. 21, 1986

Related U.S. Application Data

[63] Continuation-in-part of Ser. No. 797,790, Nov. 14, 1985, Pat. No. 4,650,439, which is a continuation of Ser. No. 679,814, Dec. 10, 1984, abandoned.

[51] Int. Cl.$^4$ ............................................. F16D 3/26
[52] U.S. Cl. ........................................ 464/14; 464/118
[58] Field of Search ................... 464/7, 11, 14, 117, 464/118

[56] References Cited

U.S. PATENT DOCUMENTS

| | | | |
|---|---|---|---|
| 1,247,291 | 11/1917 | Lehman | 464/14 |
| 1,911,214 | 5/1933 | Van Ranst | 464/118 |
| 1,939,653 | 12/1933 | Bijur | 464/14 X |
| 1,950,579 | 3/1934 | Swenson | 464/14 |
| 1,979,768 | 11/1934 | Pearce | 464/118 |
| 1,987,807 | 1/1935 | Swenson | 464/118 X |
| 2,032,496 | 3/1936 | Pearce et al. | 464/14 |
| 2,067,286 | 1/1937 | Pearce | 464/11 |
| 2,746,273 | 5/1956 | Hughes | 464/14 |
| 2,991,634 | 7/1961 | Daley, Jr. | 464/11 X |
| 3,120,746 | 2/1964 | Kayser | 464/14 X |
| 3,543,536 | 12/1970 | Rekow | 464/14 X |
| 3,785,460 | 1/1974 | Smith et al. | 464/14 X |
| 4,040,504 | 8/1977 | Smith | 464/11 X |
| 4,257,243 | 3/1981 | Herchenbach | 464/118 |
| 4,464,136 | 8/1984 | Konrad et al. | 464/14 |
| 4,490,125 | 12/1984 | Konrad et al. | 464/11 |
| 4,508,522 | 4/1985 | Numazawa et al. | 464/11 |
| 4,650,439 | 3/1987 | Mayhew | 464/11 |

Primary Examiner—Daniel P. Stodola
Attorney, Agent, or Firm—Quarles & Brady

[57] ABSTRACT

A lubrication passageway for a universal joint which has a pair of yokes. The yokes are pivotally connected to one another and each has an axis of rotation. An annular groove is formed in an arm of one of the yokes in a plane which is spaced apart from the axis of rotation of the yoke and perpendicular to an imaginary line which is normal to the axis. A first passageway provides lubricant to the side of the groove which is distal from the centering apparatus. A second passageway provides lubricant from the side of the groove proximate to the centering apparatus to the centering apparatus. The annular groove acts as a check valve to prevent lubricant from flowing out of the centering apparatus when the joint is rotating. A sustem for lubricating a centering plate and bearings for the universal joint is also disclosed.

3 Claims, 5 Drawing Sheets

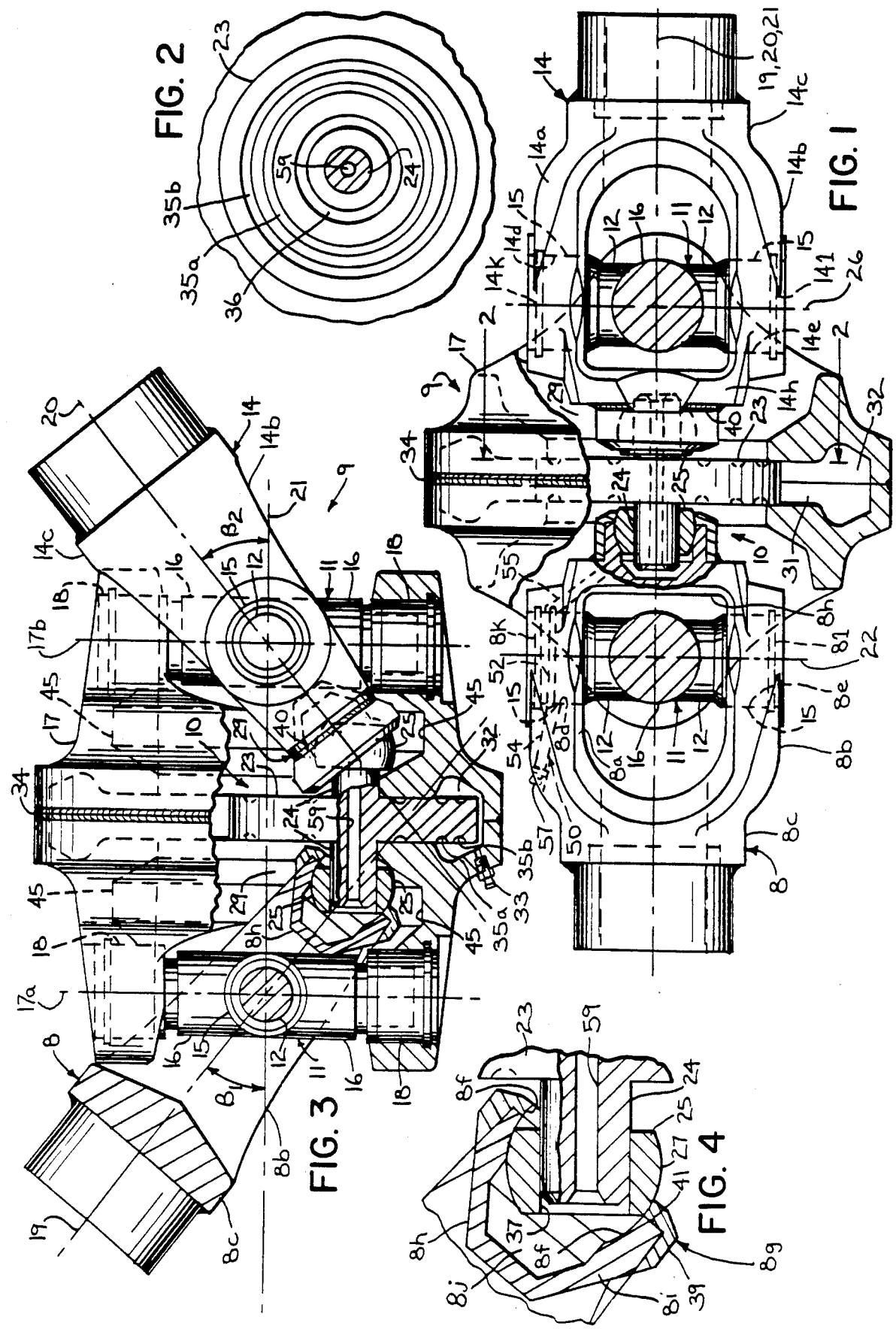

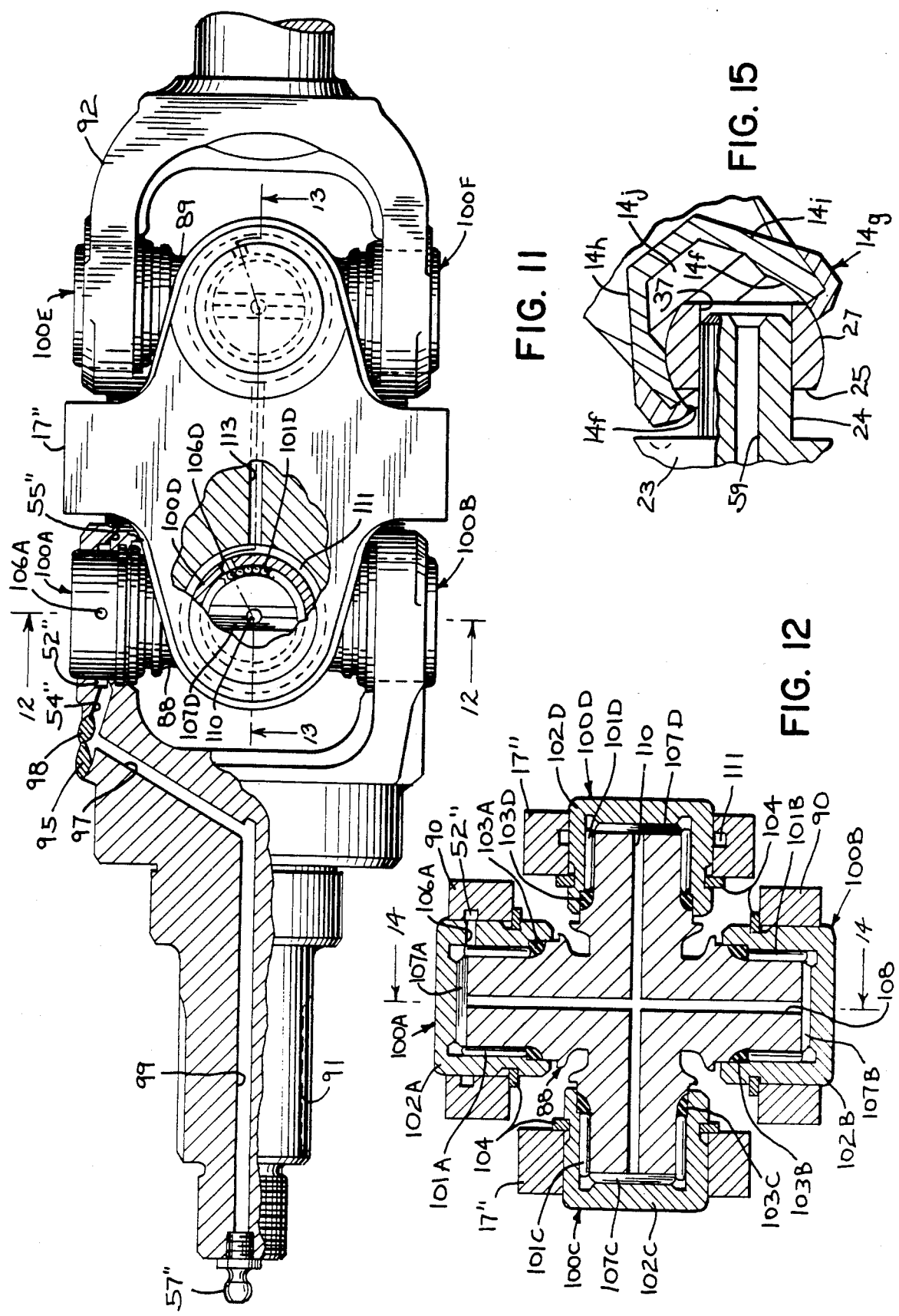

UNIVERSAL JOINT WITH IMPROVED LUBRICATION

This is a continuation-in-part of U.S. patent application Ser. No. 797,790, filed Nov. 14, 1985, now issued as U.S. Pat. No. 4,650,439, which is a continuation of U.S. patent application Ser. No. 679,814, filed Dec. 10, 1984, now abandoned.

BACKGROUND OF THE INVENTION

This invention relates to a universal joint with an improved fail-safe lubrication system.

Universal joints have found wide application in automotive, agricultural, aircraft, industrial and instrument applications to couple two rotary shafts that have an angular misalignment. A particularly common type of constant velocity universal joint is the double Hooke's joint. A double Hooke's joint typically comprises a double inner housing, a pair of outer yokes, a pair of cross-links with each cross-link pivotally connecting one of the outer yokes to one of the ends of the double inner housing, and a centering apparatus for connecting the two outer yokes to one another. The drive shaft is connected to one of the outer yokes and the driven shaft is connected to the other outer yoke. The centering apparatus operates to equalize the angles between the drive shaft, the driven shaft, and the axis of the double inner housing to provide a constant velocity ratio between the drive and the driven shaft.

Continual metal-to-metal sliding contact in the centering apparatus has posed a problem in prior universal joints. Lubrication has been the basic solution, but it has been difficult to insure easy application of the lubricant to the proper place in the centering apparatus and that the lubricant stay there during operation of the joint. Under operation, centrifugal forces act on the lubricant which tend to throw the lubricant radially outward. Normally, lubrication fittings have a one-way check valve which keeps the lubricant from being thrown outside of the centering apparatus. However, if the lubrication fitting malfunctions, works loose, is removed, or is broken off, the lubricant could have been lost in prior universal joint centering apparatuses. This resulted in running the centering apparatus dry and consequent accelerated wear of the centering apparatus.

SUMMARY OF THE INVENTION

The invention provides a universal joint for coupling a pair of shafts having an angular misalignment between them. The joint has a first member with a first axis of rotation and a second member pivotally connected to the first member, the second member having a second axis of rotation. A lubrication passageway includes an annular groove in the first member which is in a plane spaced apart from the first axis of rotation and perpendicular to an imaginary line which is normal to the first axis of rotation. A first passageway provides lubricant to the groove. A second passageway directs lubricant from the groove to a location distal from the groove. As the first member rotates, the groove acts as a check valve to inhibit the flow of lubricant past it. Therefore, the groove helps prevent running the universal joint dry in the event that a lubrication fitting for the joint fails.

In one preferred mode, each one of first and second yokes has a collar for mounting the yoke on one of the shafts coaxial with the shaft to define a shaft axis along the axis of the shaft to which the yoke is mounted. Each yoke also has a pair of arms extending from the collar in the shaft axial direction, the arms being equally spaced apart from the shaft axis and having a bearing race receiving through-bore therein. The through-bores of each shaft are axially aligned with one another along a yoke axis which is perpendicular to the shaft axis. Means are also provided for pivotally connecting the first and second yokes, the means including a bearing in each of the bearing race receiving through-bores. A first bridge joins the arms of the first yoke on the side of the through-bores opposite from the collar of the first yoke. A centering apparatus connects the first and second yokes for providing the angle subtended by the shaft axis of the first yoke and the housing axis equal to the angle subtended by the shaft axis of the second yoke and the housing axis. The centering apparatus also includes a first crown extending from the first bridge away from the collar of the first yoke, the first crown defining a recess which is axially aligned with the shaft axis.

The first yoke also has a lubrication passageway. The lubrication passageway includes an annular groove in one of the through-bores, the groove being co-axial with the yoke axis of the first yoke and in a plane which is perpendicular to the plane defined by the shaft and yoke axis of the first yoke. The annular groove has a collar side adjacent to the collar and a bridge side adjacent to the bridge. A first passageway provides lubricant to the collar side of the annular groove and a second passageway provides lubricant from the bridge side of the annular groove to the recess of the crown. In this way, lubricant can be easily provided to the centering apparatus and is impeded from being thrown radially outwardly away from the centering apparatus when the joint is operated.

Preferably, the means for connecting the first and second yokes also includes a double inner housing defining a housing axial direction and a pair of cross-links. Each cross-link has a pair of trunnions journalled in the bearings of one of the yokes and a pair of trunnions journaled in one end of the double inner housing. A second bridge joins the arms of the second yoke on the side of the bearing receiving through-bores of the second yoke opposite from the collar of the second yoke.

In one embodiment, the centering apparatus further comprises a second crown extending from the second bridge opposite from the collar of the second yoke, the crown defining a recess therein. A centering plate within the double inner housing is between the first and second yokes, and is restrained axially but free to move radially. A pin extends from each side of the centering plate in the housing axial direction. A pair of sliders are journalled on the pin for translation relative to the pin in the housing axial direction with sliding surface contact between each slider and the pin. Each crown captures the adjacent slider with spherical surfaces in the recesses which mate with spherical surfaces on the exterior of the respective sliders to provide sliding surface contact between the yokes and the corresponding sliders. This structure provides a universal joint which is capable of large angular misalignments within a very limited space. It also provides sliding surface contact in the centering apparatus, which further helps reduce wear in the centering apparatus.

In this embodiment, an axial bore can be provided through the pin. This allows lubricant to be pumped from the recess of the first crown through the axial bore to the recess of the second crown. Also, a radial passageway can be provided in the centering plate from the axial bore to the outer periphery of the centering plate. The radial passageway allows flow of lubricant from the axial bore to the sliding surfaces of the centering plate. Preferably, a relief valve is provided in the passageway to insure that the crowns and axial bore fill with lubricant before the lubricant flows through the radial passageway.

A lubrication system for the cross-link bearings is also provided. A first annular groove is provided in one of the bearing race receiving through-bores of one of the pairs of housing arms around a first of the bearings, the first bearing journaling a first cross-link. A second annular groove is provided in one of the bearing race receiving through-bores of the other of the pairs of housing arms around a second of the bearings, the second bearing journaling the second cross-link. A passageway provides communication between the first and second annular grooves. The bearing races of the first and second bearings each have a bore to provide communication from the respective first or second annular groove to the interior of the bearing. Each cross-link has a bore extending through each pair of opposed trunnions, the bore extending through one pair intersecting the bore extending through the other pair. The bores in the cross-links provide communication from the first or second bearings to all of the other bearings journaling the respective first or second cross-link. Thus, this system can be used to lubricate all of the bearings of a double universal joint from a single lubrication fitting.

It is therefore a primary object of the invention to provide a universal joint with a lubrication system which impedes flow of lubricant away from the centering apparatus and/or cross-link bearings.

It is a further object of the invention to provide a universal joint wherein the centering apparatus is easily lubricated.

It is another object of the invention to provide a universal joint having a wear resistant centering apparatus.

It is another object of the invention to provide a universal joint wherein the cross-link bearings are easily lubricated.

These and other objects and advantages of the invention will become apparent from the following detailed description and from the drawings.

DESCRIPTION OF THE DRAWINGS

FIG. 1 is a side plan view partially in section illustrating a universal joint of the present invention, the joint being shown in an aligned position;

FIG. 2 is a fragmentary view taken along the line 2—2 of FIG. 1;

FIG. 3 is a top plan view partially in section showing the joint of FIG. 1 in an extreme position;

FIG. 4 is a detail view of a portion of the apparatus shown in FIG. 3;

FIG. 11 is a view partially in section of a fourth embodiment of a universal joint of the present invention;

FIG. 12 is a sectional view taken along line 12—12 of FIG. 11;

FIG. 15 is a detail view similar to FIG. 4, but of the other side of the centering apparatus.

DETAILED DESCRIPTION OF THE PREFERRED EMBODIMENT

Figure 5:
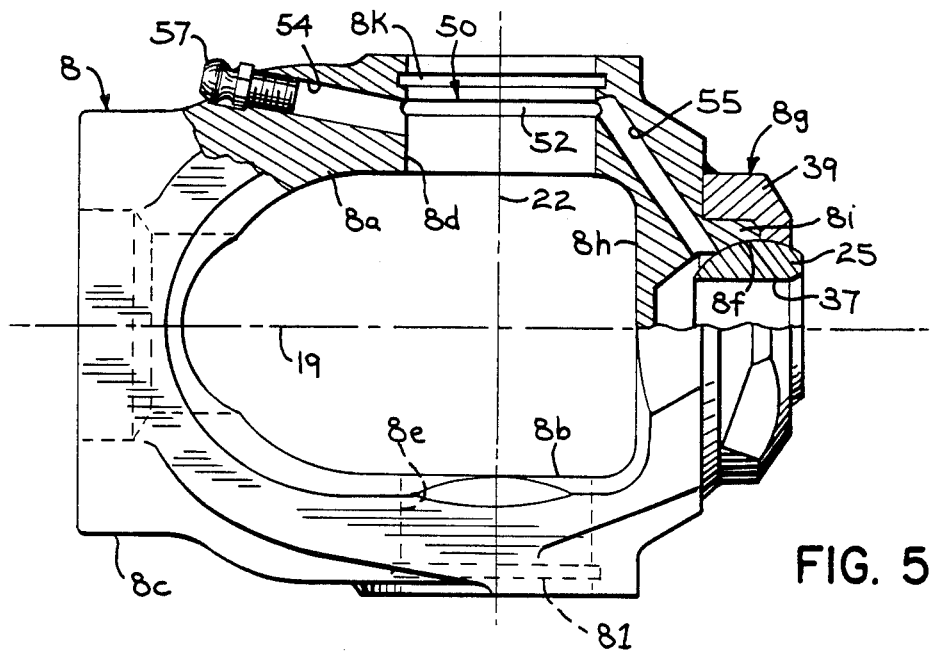
FIG. 5 is a detail view partially in section illustrating a left yoke for the joint of FIG. 1.

FIG. 1 illustrates a universal joint g of the present invention. The universal joint g is a constant velocity universal joint of the double Hooke's type and incorporates a yoke 8. Each one of a pair of cross-links 11 has opposed trunnions 12. The trunnions 12 of the left cross-link are journalled in arms 8a and 8b of the yoke 8 and the trunnions 12 of the right cross-link 11 are journalled in arms 14a and 14b of a yoke 14 by suitable bearings 15. As best shown in FIG. 3, each cross-link 11 also has a pair of opposed trunnions 16, each of which are journalled in one of the ends of a double inner housing 17 by suitable bearings 18 to rotate about housing throughbore axes 17a and 17b.

The arms of each yoke 8 or 14 are spaced apart from one another and extend from a collar 8c or 14c which is for connecting the yoke to a shaft (not shown). The collar 8c therefore defines a shaft axial direction 19 (FIGS. 1 and 3) and the collar 14c defines a shaft axial direction 20. Each arm 8a, 8b and 14a, 14b has a bearing race receiving throughbore 8d, 8e and 14d, 14e therein to receive the outer races of the bearings 15 in a slight press fit. An annular groove 8k, 8l and 14k, 14l is provided in each respective throughbore 8d, 8e and 14d, 14e to receive a snap-ring (not shown) to also hold the bearings 15 in the arms 8a, 8b and 14a, 14b. The through-bores 8d and 8e are axially aligned with one another along a yoke axis 22 and the through-bores 14d and 14e are axially aligned with one another along a yoke axis 26. The yoke axis 22 is perpendicular to the shaft axis 19 and the yoke axis 26 is perpendicular to the shaft axis 20.

A drive shaft (not shown,, such as the power take-off shaft of a tractor, is coupled to collars 8c or 14c and the shaft to be driven (not shown) is coupled to the other collar. The collars 8c and 14c shown have internal splines but could just as well have external splines or some other means for coupling the yokes 8 and 14 to the drive and driven shafts. When the drive shaft and the driven shaft are misaligned as shown in FIG. 3, the velocity of the driven shaft will equal the velocity of the drive shaft only if the angles $\beta_1$ and $\beta_2$ between the shaft axes 19 and 20 of the outer yokes 8 and 14 and housing axis 21 of the double inner housing 17 are equal.

A centering apparatus 10 provides a connection between the outer yokes 8 and 14 to insure that the angles $\beta_1$ and $\beta_2$ will be equal as the drive shaft rotates the driven shaft. The centering apparatus 10 includes a circular centering plate 23 (FIG. 2) which is restrained against axial movement but can move radially within the double inner housing 17 intermediate of the outer yokes B and 14. A pin 24 extends from each side of the centering plate 23. A pair of sliders 25 is journalled on the pin 24, one on each side of the centering plate 23.

Each slider 25 has a spherical outer surface 27 (FIG. 4) which is slidably received by a mating spherical inner surface 8f or 14f defined by each one of a pair of crowns 8g and 14g. Each crown extends from a bridge 8h or 14h away from the respective collars 8c or 14c. Each bridge 8h or 14h joins the arms of the respective yoke 8 or 14 on the side of the through-bores 8d, 8e and 14d, 14e opposite from the respective collars 8c or 14c.

The centering plate 23 is restrained against axial movement but allowed to move radially by being positioned in an annular raceway 31 defined by the double inner housing 17 intermediate of the outer yokes 8 and 14. Radially outward of the raceway 31, a grease reservoir 32 is provided for storage of lubricant and a lubrication fitting 33 (FIG. 3) is provided to replenish the lubricant in the reservoir 32 from outside of the double inner housing 17. The raceway 31 is readily formed by conventional machining techniques if the double inner housing 17 is made in two halves. The two halves can then be welded together as shown by the weld bead 34.

The centering plate 23 has inner and outer annular grease grooves 35a and 35b (FIGS. 2 and 3), one of said grooves on each side, which extend into the grease reservoir 32 to pick up lubricant and carry it to the sliding surfaces of the plate 23 and the raceway 31 where it is most needed. Each side surface of the centering plate 23 also includes an annular recess 36 to provide clearance for the crowns 8g and 14g in extreme positions of angular misalignment.

The pin 24 is preferably integral with the centering plate 23 for strength and is preferably circular cylindrical. The pin 24 projects far enough from each side of the centering plate 23 to provide adequate surface contact with the sliders 25 even in the extreme position of FIG. 3. This insures that the sliders will not bind on the pin. Preferably, the ratio of the slider 25 diameter to the pin 24 diameter is about 1.8:1. This provides clearance between the crowns 8g or 14g and the pin 24 in wide angle extreme positions and also insures that the sliders will be held within the crowns. Each slider 25 is journalled on the pin 24 by having a through-bore 37 which is sized and shaped to closely receive the pin 24.

As best illustrated in FIG. 4, each crown 8g or 14g comprises a seat portion 8i or 14i which is preferably integral with the respective outer yoke 8 or 14 and a cap 39 which is welded or otherwise secured to the seat portion as shown at 40. The maximum chord of the spherical surface 8f or 14f which is in the plane of the inner end of the respective seat portion 8i or 14i is approximately equal to the diameter of the spherical surface 8f or 14f. The portion of each spherical surface 8f or 14f defined by the caps 39 therefore holds the sliders 25 within the crowns 8g and 14g.

The cavity defined by each crown 8g or 14g also includes a recess 8j or 14j outward of the spherical surface 8f or 14f. Each recess 8j or 14j is contoured to provide adequate clearance between the seat portion 8i or 14i and the pin 24 in all positions of operation. Also note that the double inner housing 17 has recesses 45 (FIG. 3) which provide clearance between the housing 17 and the crowns 8g and 14g in extreme positions of operation.

The centering apparatus 10 provides surface contact between the pin 24, the slider 25 and the yokes 8 and 14. This distributes extreme stresses which are inherent in double universal joints over a relatively large area to prolong the life of the joint without sacrificing a compact design. Since the size of the pin 24 is much smaller than the size of comparable tubular recess defining structures in the prior art, the centering plate 23 has a larger range of motion within the annular raceway 31 between the limits where the pin 24 abuts the raceway 31. Therefore, the double inner housing 17 can be made relatively small which results in a safer and more vibration-free design. Also, the pin 24 abutting the raceway 31 in this way reduces the moment arm of the forces exerted on the pin 24 by the yokes 8 and 14 in extreme positions.

Figure 6:
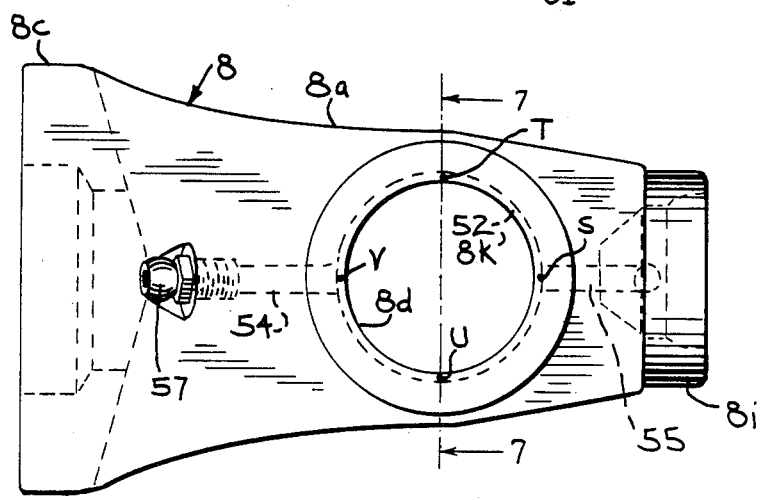
FIG. 6 is a top plan view of the yoke of FIG. 5.

The yoke 8 differs from the yoke 14 because a lubrication passageway 50 is provided in the yoke 8. Referring to FIGS. 5 and 6, the passageway 50 includes an annular groove 52 in the through-bore 8d which is radially inward from the snap-ring groove 8k. The groove 52 is about 0.10 inches wide and 0.05 inches deep and is coaxial with the yoke axis 22 and in a plane which is perpendicular to the plane defined by the shaft axis 19 and the yoke axis 22.

The lubrication passageway 50 also includes bores 54 and 55. The bore 54 is about 0.22 inches in diameter and is in the plane defined by the shaft axis 19 and the yoke axis 22. The bore 54 slopes slightly radially inwardly at an angle of about 10°–11° to shaft axis 19 through the arm 8a from a shoulder portion of the arm 8a. The bore 54 provides communication from a lubrication fitting 57, which is seated in a counter-bore at the outer end of the bore 54, to the collar side of the annular groove 52 where the annular groove 52 intersects the plane defined by the shaft axis 19 and the yoke axis 22. The bore 55 is about 0.19 inches in diameter and is also in the plane defined by the shaft axis 19 and yoke axis 22. It slopes radially inwardly at about a 55° angle to the shaft axis 19 from the bridge side of the annular groove 52 where the annular groove 52 intersects the plane defined by the shaft axis 19 and the yoke axis 22 to the recess 8j just outward of the spherical surface 8f. Communication is also provided between the recess 8f to the recess 14f by an axial bore 59 through the pin 24.

Lubricant is provided to the pin and slider surfaces of the centering apparatus 10 through the passageway 50. Lubricant is pumped through the fitting 57 into the bore 54, around the annular groove 52 to the bore 55 and down into the recess 8j. Continued pumping moves the lubricant from the recess 8j through the bore 59 to the recess 14j. Hence, one lubrication fitting 57 services both sides of the centering apparatus 10.

The lubrication fitting 57 is of a conventional type and includes a one-way check valve (not shown) which admits lubricant into the bore 54 but does not allow reverse flow out of the bore 54. However, even if the lubrication fitting would malfunction, work loose, be removed, or be broken off, lubricant would remain in the centering apparatus 10. This is because the annular groove 52 acts as a check valve when the joint is operating to keep lubricant from flowing out of the centering apparatus 10.

Figure 7:
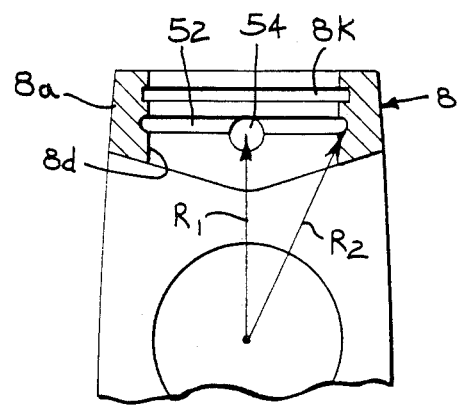
FIG. 7 is a sectional view taken along line 7—7 of FIG. 6.

Referring to FIG. 7, the radial distance from the shaft axis 19 to the annular groove 52 increases from the distance R1, which is equal to the distance from the shaft axis 19 to the bridge side of the annular groove 52 at the angular position of point S in FIG. 6. This position is where the annular groove 52 intersects the plane defined by the shaft axis 19 and the yoke axis 22. This radial distance increases to a maximum distance R2, which is the distance from the shaft axis 19 to the annular groove 52 at the angular position of either point T or U in FIG. 6. These positions are where the annular groove 52 intersects a plane including the yoke axis 22 and which is perpendicular to the plane defined by the shaft axis 19 and yoke axis 22. From either of these points toward the collar, the radial distance decreases to the minimum distance $R_1$ at the angular position of point V in FIG. 6. This position is where the collar side of the annular groove 52 intersects the plane defined by the shaft axis 19 and yoke axis 22. Note that as used herein, "bridge side" means the full 180° arc of the annular groove 52 to the right of a line through points T and U, and "collar side" means the full 180° arc of the annular groove 52 which is to the left of a line through points T and U, as viewed in FIG. 6.

This construction results in the centrifugal force gradient acting on the lubricant being increasing around the annular groove 52 from point S to either point T or U. However, from either point T or U to point V, the gradient is decreasing. Thus, in operation, centrifugal force impedes flow of lubricant past points T and U toward the collar to help keep lubricant in the centering apparatus.

Figure 8:
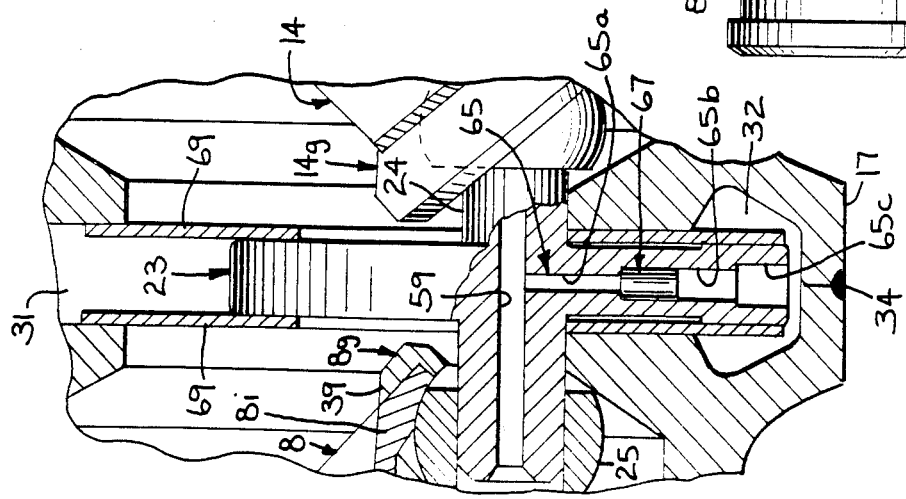
FIG. 8 is a sectional view of a modification of the universal joint of FIG. 1.

FIG. 8 shows a modification of the embodiment of FIGS. 1–7. In this embodiment, lubricant is provided to the grease reservoir 32 through a radial passageway 65 in the centering plate 23. The passageway 65 includes bore 65a in communication with axial bore 59, a larger bore 65b coaxial and in communication with bore 65a, and a still larger counterbore 65c from bore 65b to the outer periphery of the centering plate 23.

A 200 p.s.i. relief valve 67 (FIG. 9) including a ball 67a and spring 67b is screwed or pressed into bore 65b and seated against the end of bore 65a. The relief valve 67 forces the crowns 8g and 14g, the axial bore 59, and the bore 65a to fill with lubricant before the lubricant is pumped into the grease reservoir 32. The relief valve 67 also keeps lubricant in the crowns 8g and 14g, , axial bore 59, and the bore 65a from being thrown radially outwardly into the grease reservoir 32. This modification makes the lubrication fitting 33 (FIG. 3) and the bore associated with it unnecessary so they can be eliminated. Therefore, in this embodiment, all the surfaces in the centering apparatus that require lubrication are accessible from the single lubrication fitting 57.

Figure 9:
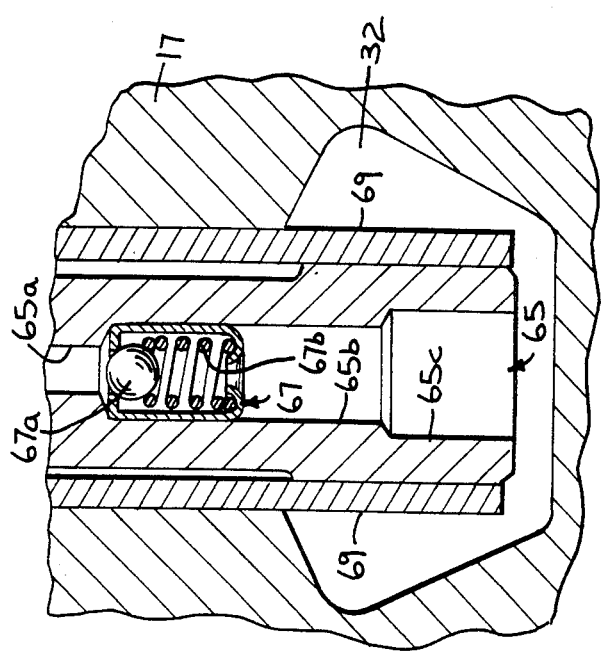
FIG. 9 is a detail view of a portion of the universal joint of FIG. 8.

Wear plates 69 may also be used as shown in the embodiment of FIGS. 8 and 9. An annular wear plate 69 is provided on each side of the centering plate 23 and floats in the raceway 31 to close off the raceway from dirt and debris in all positions of operation. In this embodiment, it is also shown that the centering plate 23 may be wider adjacent to the outer periphery to reduce the amount of machining of wearing surfaces that must be performed. Also, in this embodiment, no lubricant distribution grooves 35a and 35b are provided.

Figure 10:
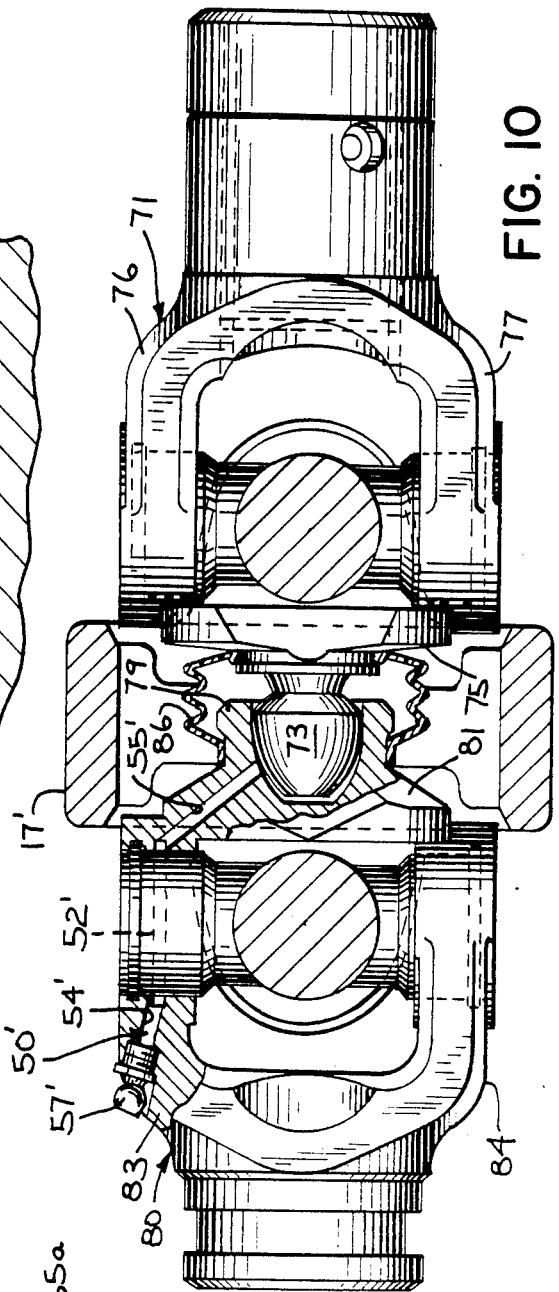
FIG. 10 is a sectional view of a third embodiment of a universal joint of the present invention.

FIG. 10 illustrates a third embodiment having a centering apparatus which is very different from that of the previous two embodiments. In this joint, one yoke 71 has a lobe 73 extending from a bridge 75 spanning arms 76 and 77 of the yoke 71. A crown 79 on the other yoke 80 extends from a bridge 81 which spans arms 83 and 84 and defines a recess which mates with the lobe 73. This joint is suited for smaller angles than the previous two joints. However, a significant feature that this joint has in common with the other embodiments is a grease passageway 50'. The grease passageway is formed the same as the grease passageway 50 in the other embodiments and performs the same function. It provides lubricant to the recess in the crown 79 to lubricate the sliding surfaces in the crown and on the lobe 73. A flexible bellows 86 may also be provided to keep dirt out of the centering apparatus.

A fourth embodiment is shown in FIGS. 11–14. In this embodiment, an annular groove 52" provides a gateway to a lubrication system for all of the eight bearings which journal cross-links 88 and 89 in outer yokes 90 and 92 and in double inner housing 17". Referring to FIG. 11, the yokes 90 and 92, center housing 17", and centering apparatus, if the joint has one at all, may be of any suitable configuration. The centering apparatus and double inner housing, for example, may be that of FIGS. 1–7 or FIG. 10, in which case the annular groove 52" may also provide a gateway for lubricant to the centering apparatus. In addition, if the centering apparatus and housing were that of FIGS. 1–7, the modification of FIGS. 8 and 9 could be provided to lubricate the centering plate.

In the embodiment of FIGS. 11–14, a lubrication fitting 57" is provided at the outer end of the collar 91 of the yoke 90. A lubrication passageway 54" is drilled and capped, such as with a weld bead 95. Another lubrication passageway 97 intersecting passageway 54" is also drilled and capped, such as with a weld bead 98. A third lubrication passageway 99 provides communication between the lubrication passageway 97 and the lubrication fitting 57". Thus, because the fitting 57" is radially inward from the annular groove 52", centrifugal force tends to throw lubricant from the fitting towards the annular groove.

The lubrication passageway 54" provides lubricant to the annular groove 52" as already described for the similar structures in the previous embodiments. As stated, from the annular groove, the lubricant may be pumped to the centering apparatus and/or to the centering plate, if one is provided. In addition to this, in this embodiment, the lubricant is pumped from the annular groove 52" to the bearings which journal the cross-links 88 and 89.

Needle bearings 100A–H include respectively needle rollers 101A–H, bearing cups or races 102A–H, and seals 103A–H to journal each one of one pair of the trunnions of each cross-link 88 and 89 in arms on the ends of the double inner housing 17" and each one of the other pair of the trunnions of each cross-link 88 and 89 in the arms of the respective outer yoke 90 or 92. Therefore, there are eight bearings 100A–H, bearings 100A–D for the cross-link 88 and 100E–H for the cross-link 89. Each of the bearings is held in place with a C-clip 104 in a groove around the outside of the bearing cup 102.

As shown best in FIG. 12, lubricant enters bearing 100A from the annular groove 52" through a bore 106A in the bearing cup 102A. Lubricant flows around the interior of the bearing cup 102A to a serration 107A in the end of the "A" trunnion of the cross-link 88 and flows from the outside circumference of the end of the trunnion through the serration 106A to a central bore 108. The bore 108 extends through the cross-link 88 to the end of trunnion "B" opposite from trunnion "A" where it opens into a serration 107B. Therefore, a lubrication passageway is provided from the interior of bearing 100A to the interior of bearing 100B.

A lubrication passageway is also provided from bearing 100C to bearing 100D. Serrations 107C and D are formed in the ends of trunnions "C" and "D" of the cross-link 88 and a central bore 110 provides communication between the serrations and also intersects bore 108. Therefore lubricant also flows from bore 108 to the interior of bearings 100C and 100D.

Figure 13:
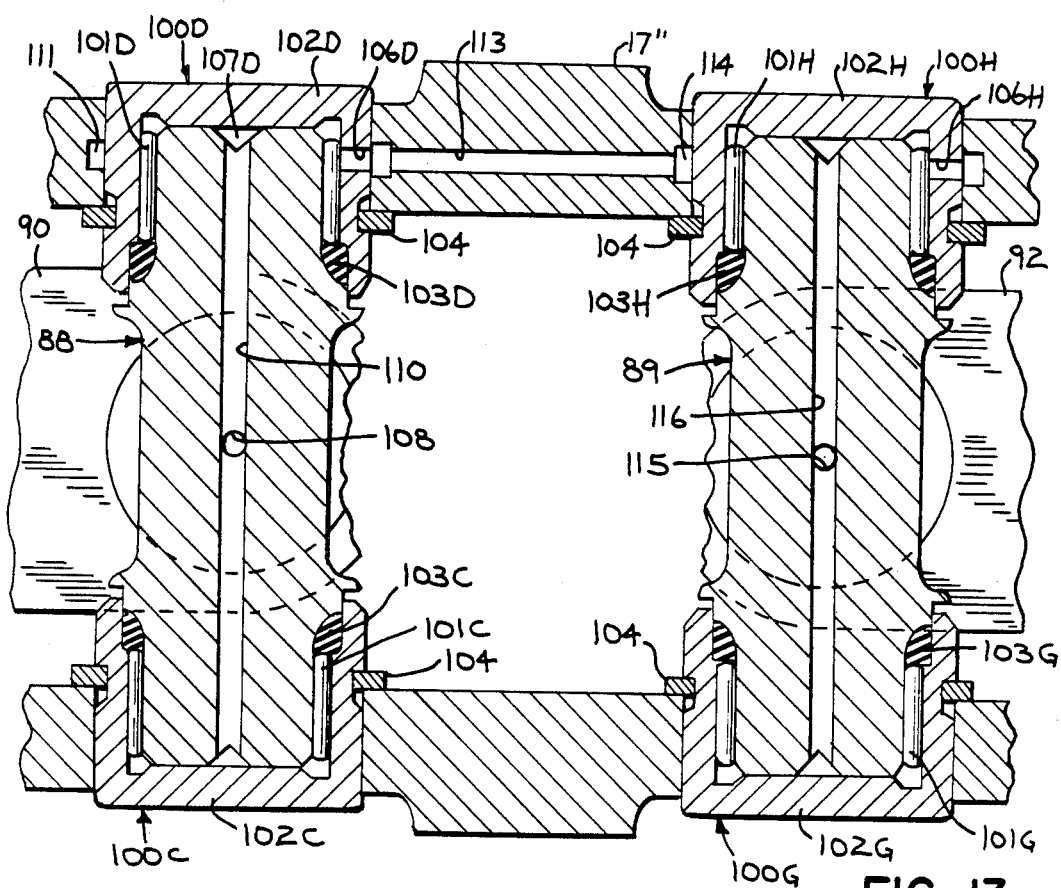
FIG. 13 is a sectional view taken along line 13—13 of FIG. 11.
Figure 14:
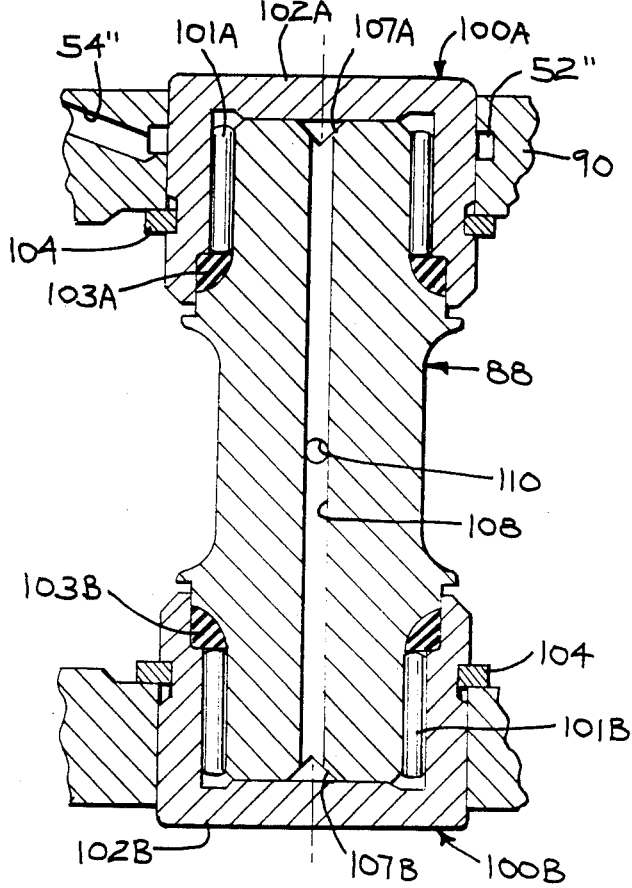
FIG. 14 is a sectional view taken along line 14—14 of FIG. 12.

Referring to FIG. 13, bearing cup 100D has a bore 106D in communication with an annular groove 111 in the double inner housing 17″. A bore 113 in the housing 17″ provides a passageway between the groove 111 and an annular groove 114 in the housing 17″ around bearing cup 102H. The bearing cup 102H has a bore 106H communicating with the groove 114. Therefore, lubricant flows from bearing 100D to bearing 100H through a passageway including groove 111, bore 113, and groove 114.

Once inside bearing 100H, lubricant can flow to each of the other three bearings 100E, F and G because cross-link 89 is identical to cross-link 88. Serrations 107 E-G are provided on the ends of the respective arms of the cross-link 89. A bore 115 connects serrations 107E and F (not shown) and intersects a bore 116 which connects serrations 107H and G.

Note that the bearing cups 102A-H are pressed into their respective bearing race receiving through-bores in the yokes and double inner housing. Therefore, lubricant cannot be thrown out by centrifugal force from the annular grooves that surround bearing cups 102A, D and H between the bearing cup and the respective race receiving through-bores.

In the embodiment of FIGS. 11-14, lubricant will tend to be thrown by centrifugal force to the annular grooves in the yoke or housing and specifically to the area of these grooves that is radially furthest from the center line of the double inner housing. Referring to FIG. 11, this area is in a plane defined by the intersecting axes of the adjacent cross-link which extends through the center of the groove. Therefore, each annular groove provides a check valve beyond which lubricant flow is restricted when the joint is rotating.

Many modifications and variations to the preferred embodiment will be apparent to those skilled in the art but which will still embody the invention. Therefore, it is not intended that the invention be limited by the scope of the foregoing description or drawings, but by the claims which follow.

We claim:

1. A universal joint, comprising:
   a first member with a first axis of rotation;
   a second member pivotally connected to the first member; and
   a lubrication passageway comprising:
      an arcuate groove in said first member, said groove being in a first plane which is spaced apart from the first axis of rotation and is perpendicular to an imaginary line which is normal to the first axis of rotation, said arcuate groove having an entry portion on one side of a second plane which is normal to the first axis of rotation and which intersects the groove where the groove is farthest from the first axis of rotation and said groove having an exit portion on the other side of said second plane;
      a first passageway in communication with one of said portions for providing lubricant to the groove, said portion being the entry portion; and
      a second passageway in communication with and extending radially inward from the other one of said portions for directing lubricant from the groove to a sliding surface radially inward from the groove, said portion being the exit portion;
   wherein the centrifugal force gradient increases from any point in the groove where the second passageway is in communication with the groove to any point in the groove where the groove is farthest from the first axis of rotation; and
   wherein lubricant is admitted to the universal joint through the groove from the entry portion to the exit portion and then to the second passageway such that backflow through the second passageway due to centrifugal force is impeded by the groove; and
   wherein the first member includes a bearing press fitted in a recess and the groove is defined between the bearing and the recess.

2. A universal joint as in claim 1, wherein the groove is annular.

3. A universal joint as in claim 1, further comprising a centering apparatus at an end of at least one of the members and wherein the second passageway leads from the groove to the centering apparatus.

* * * * *